United States Patent [19]

Ito

[11] Patent Number: 5,024,022
[45] Date of Patent: Jun. 18, 1991

[54] AUTOMOBILE WINDOW OPENING AND CLOSING DEVICE

[76] Inventor: Kazuo Ito, No. 102, Daiichi Fujinoki-soh, 2888, Haze-cho, Sakai-shi, Osaka-fu, Japan

[21] Appl. No.: 540,351

[22] Filed: Jun. 19, 1990

[30] Foreign Application Priority Data

Jul. 19, 1989 [JP] Japan ............................. 1-85390[U]
Feb. 2, 1990 [JP] Japan ............................. 2-10049[U]

[51] Int. Cl.$^5$ ............................................. E05F 15/00
[52] U.S. Cl. ......................................... 49/139; 49/349
[58] Field of Search ..................... 49/139, 140, 349; 74/625

[56] References Cited

U.S. PATENT DOCUMENTS

| 2,621,541 | 12/1952 | Rath ................................ 49/140 X |
| 2,621,544 | 12/1952 | Rossmann ..................... 49/140 X |
| 2,900,183 | 8/1959 | Leslie et al. ................... 49/139 X |
| 3,791,071 | 2/1974 | Niklaus ........................... 49/349 X |

FOREIGN PATENT DOCUMENTS

2743982 4/1979 Fed. Rep. of Germany ........ 49/139

Primary Examiner—Philip C. Kannan
Attorney, Agent, or Firm—Koda and Androlia

[57] ABSTRACT

An automobile window opening and closing device comprising a combination of a hand open/close unit and an automatic (power-operated) open/close unit, so that the two units can be selectively operated in a most suitable way according to the situation and conditions for use and so that the two units can complement each other to provide good economical advantage.

2 Claims, 12 Drawing Sheets

AUTOMOBILE WINDOW OPENING AND CLOSING DEVICE

BACKGROUND OF THE INVENTION (1) Field of the Invention

This invention relates to an automobile window opening and closing device and, more particularly, to an automobile window opening and closing device which permits window opening operation to be carried out both electrically and manually.

(2) Description of the Prior Art

In automobiles, it has been customary to open and close the window by manually turning the regulator handle. In conventional window opening and closing devices of the manual type, it is necessary to turn the handle five or six turns in order to open the window full, which operation is rather troublesome.

With a view to avoiding such troublesomeness, a so-called power window mechanism is employed in automobiles of some latest models. This mechanism is powered by an electric motor and operates to open and close the window through mere switch control so that the driver or other person in the car will only have to manipulate the switch to open and close the window.

However, since the power window mechanism is motor-powered as above mentioned, it becomes inoperative if, for example, the power is gone off by reason of some accident or otherwise, or if the electric motor fails irrespective of the condition of the power supply.

Further, the power window mechanism requires comparatively large current for its motor-driven operation, and this poses the following problem, for example, from the view point of automobile construction.

The automotive engine does not charge the battery with power unless it is at work. Therefore, if the power window mechanism is frequently operated to open and close the window while the engine is at a standstill, electricity is consumed so much and the battery may die, it being thus difficult to restart the engine.

As such, when the power window mechanism is to be operated, the engine cannot be switched off even if the car is at a stop, which is a disadvantageous factor from the standpoint of power economy.

SUMMARY OF THE INVENTION

It is an object of the invention to provide an automobile window opening and closing device which has a manually operated mechanism and a power operated mechanism in combination and which enables best utilization of the two mechanisms for window opening and closing operation.

The automobile window opening and closing device in accordance with the invention has, in combination, manually operated drive means and power operated drive means which can be switched over from the one to the other for utilization as required. Therefore, it is possible to enable the window glass to be moved upward and downward through mere switch control when the engine is at work, and when the engine is at rest, it is possible to move the window glass upward and downward by hand and without involving battery power consumption.

Accordingly, window opening and closing can be done by selecting one of the two drive mechanisms in a most advantageous way when the engine is at work or when the engine is at rest. In this way, the two drive mechanisms can complement each other to provide good economical advantage.

BRIEF DESCRIPTION OF THE DRAWINGS

FIG. 1 illustrates a first embodiment of the invention, in which (a) is a front view, and (b) is a section taken along line A—A in (a);

FIG. 2 illustrates a manually operated drive unit 3 in first and second embodiments, in which (a) is a section taken along line B—B in FIG. 1 (a); (b) is a perspective view showing in detail the arrangement of the manually operated drive unit 3; and (c) is a section taken along line C—C in FIG. 2 (a);

FIG. 4 illustrates a second embodiment of the invention, in which (a) is a front view; (b) is a section taken along line E—E in (a); and (c) is a section taken along line F—F in (a);

FIG. 5 illustrates a third embodiment of the invention, in which (a) is a front view; (b) is a section taken along line I—I in (a); (c) is a section taken along line J—J in (a); and (d) and (e) show aspects of the third embodiment as applied for actual use, (d) being a front view thereof, (e) being a section taken along line K—K therein;

FIG. 7 illustrates a fourth embodiment of the invention, in which (a) is a front view; (b) is a section taken along line L—L therein; and (c) is a section taken along line M—M therein.

DETAILED DESCRIPTION OF THE PREFERRED EMBODIMENTS

Preferred embodiments of the invention will now be described with reference to the accompanying drawings.

First Embodiment

Figure 1:
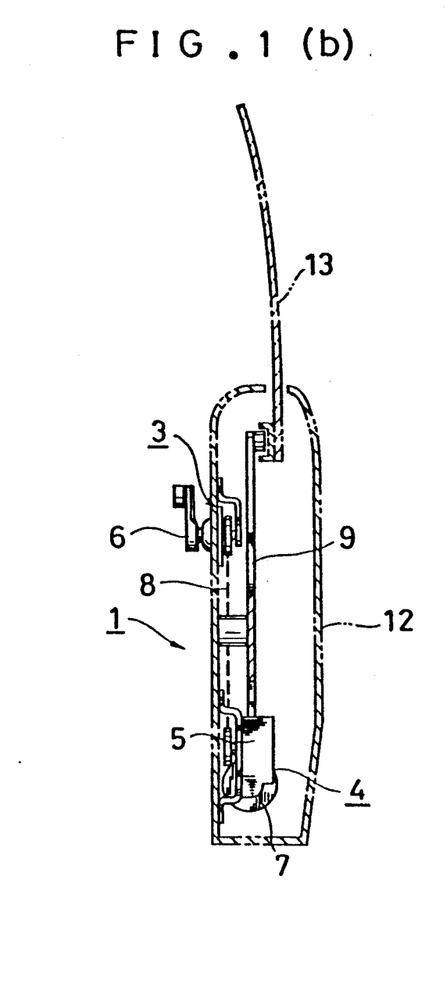

In FIGS. 1 (a) and 1 (b), a door 12 is equipped with a window glass 13 and an automobile window opening and closing device 1. The window opening and closing device 1 consists of a manually operated drive unit 3, a power-operated drive unit 4, and a gear differential unit 5.

Numeral 8 designates a chain for transmission of a driving force from the manually operated drive unit 3. Numeral 9 designates a drive arm for moving the window glass 13 upward and downward which is formed with a sector gear 10.

The manually operated drive unit 3 will be explained below.

Figure 2:
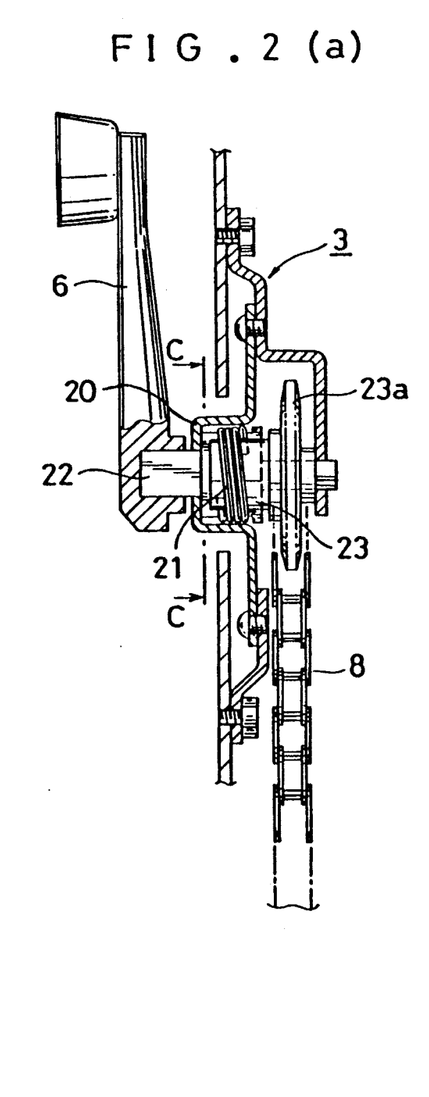

In FIG. 2 (a), the manually operated drive unit 3 comprises a handle 6, a casing 20, a spring 21, a handle rolling piece 22, and a sprocket rolling piece 23. Positional relations of these members are shown in FIG. 2 (b). In the manually operated drive unit 3, as FIG. 2 (c) shows, when force is applied by the handle 6 (in the direction of arrow G), the handle rolling piece 22 exerts force to rotate the spring 21 in a direction in which the spring 21 is contracted, so that the friction within the casing 20 is reduced to enable the spring 21 to rotate, force being thus transmitted to the sprocket rolling piece 23.

Conversely, when force is applied from the window glass side, that is, from the sprocket rolling piece 23 (in the direction of arrow H), the force from the sprocket rolling piece 23 tends to rotate the spring 21 in a direction in which the spring 21 is expanded, so that the spring 21 is allowed to expand within the casing 20 and thus restrained from rotating, with the result that no force is transmitted to the handle 6.

In other words, the manually operated drive unit 3 is of such arrangement that the sprocket rolling piece 23 is rotatable from the handle 6 side, whereas the handle 6 is unrotatable from the sprocket rolling piece 23 side, that is, driving force can be transmitted in one direction only.

Nextly, the gear differential unit 5 and the power-operated drive unit 4 whose main parts are in common with those of the gear differential unit 5 will be described.

Figure 3:
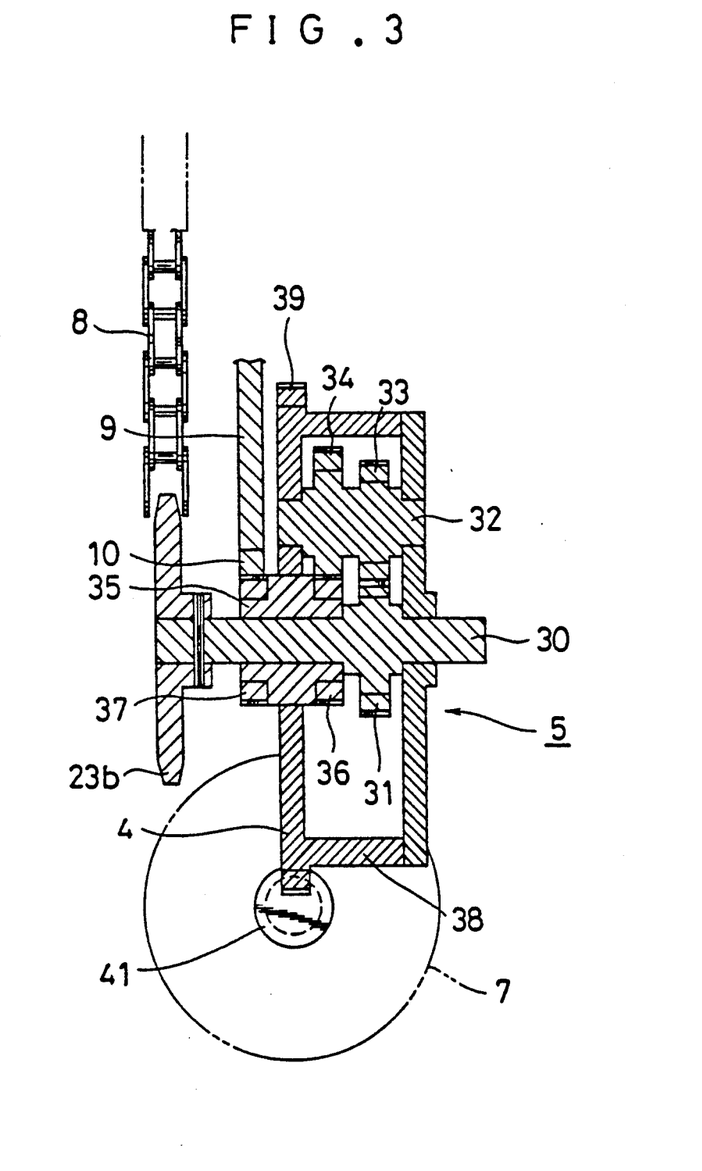
FIG. 3 is an enlarged section taken along line D—D in FIG. 1 (a) which shows a power-operated drive unit 4 in the first embodiment.

In FIG. 3, the gear differential unit 5 comprises a main shaft 30 formed with a sprocket 23b and a gear 31, a slidable rolling piece 35 rotatably fitted on the main shaft 30 and formed with gears 36, 37, differential unit casing 38 fitted on both the main shaft 30 and the slidable rolling piece 35 in such a way as to allow their rotation and formed on its outer circumferential edge with a worm wheel 39, and a shaft 32 rotatably supported in position at both ends within the differential unit casing 38 and having gears 33, 34 held in mesh with the gears 31, 36. The slidable rolling piece 35 is partially exposed outside of the gear differential unit 5 and has its gear 37 held in mesh with a sector gear 10 of the driving arm 9.

Numeral 7 designates a motor, and 41 designates a worm gear of the motor 7 which is in thread engagement with the worm wheel 39.

The switch for control of the power-operated drive unit 4 is not shown.

The arrangement of the first embodiment has now been described, and nextly the function thereof will be explained.

(1-1): Opening and closing of the window glass 13 by hand

In FIGS. 2 (a) and 3, as the handle 6 is rotated, drive force is transmitted from the sprocket 23a through the chain 8 to the sprocket 23b provided on the main shaft 30 of the gear differential unit 5. As the main shaft 30 rotates, the gear 33 on the shaft 32 which is in mesh with the gear 31 is rotated, which rotatation is transmitted to the gear 34. The gear 34 causes the gear 36 of the slidable rolling piece 35 to turn. The rotation of the slidable rolling piece 35 is transmitted to the sector gear 10 through the gear 37. Thus, the drive arm 9 is made up-and-down movable, that is, the window 13 can be opened and closed.

In the above process of rotation, if the differential unit casing 38 rotates on its axis instead of the shaft 32 being rotated, the transmission of the driving force cannot properly be effected. However, the worm wheel 39 on the outer periphery of the differential unit casing 38 is in mesh with the worm gear 41 of the motor 40, and normally the worm wheel 39 cannot drive the worm gear 41. Therefore, the differential unit casing 38 does not rotate and there is no possible inconvenience involved in the transmission of the force of rotation.

(1-2): Opening and closing of the window glass 13 by power-operated mechanism

In FIG. 3, as the motor 7 is driven to actuate the worm gear 41 to transmit turning effort to the worm wheel 39, the differential unit casing 38 turns on the main shaft 30 which is restrained from rotation, and accordingly the gear 33 of the shaft 32 is rotated by the gear 31 and the gear 34 is rotated accordingly. Because of the difference in number of teeth between the gear 31 and the gear 36, the gear 34 rotates the gear 36 of the slidable rolling piece 35. Accordingly, the gear 37 of the slidable rolling piece 35 causes the sector gear 10 to move upward and downward so that the drive arm 9 is moved upward and downward.

In the above process of movement, the main shaft 30 is inhibited from rotation because the main shaft 30 is so arranged as to transmit turning effort through the sprocket 23b to the manually operated drive unit 3, or in other words, because the manually operated drive unit 3 is inhibited from rotation from the sprocket 23a side as earlier mentioned.

In the above described embodiment, transmission of driving force from the manually operated drive unit 3 to the gear differential unit 5 is effected by means of the chain 8, but by no means is this the essential requirement. Such transmission may be carried out by some other suitable means (such as a belt or gears), and in corresponding relation thereto the sprocket rolling piece 23 may be varied accordingly.

Second Embodiment

Nextly, a second embodiment of the invention will be described.

For the sake of convenience, description of components identical with those of the first embodiment is omitted.

Figure 4:
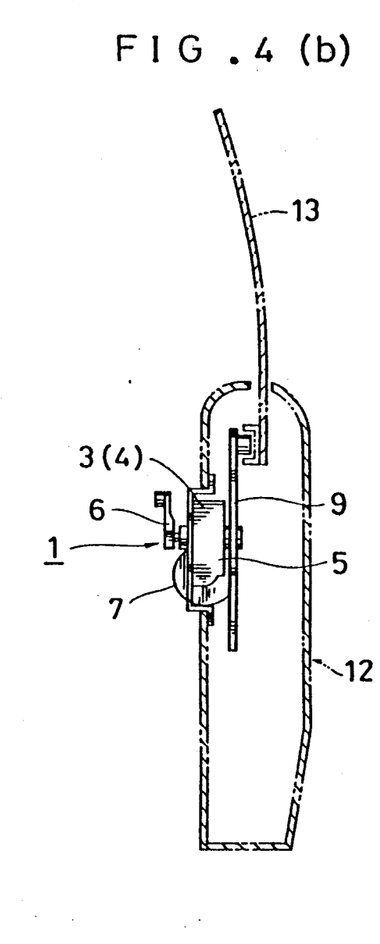

In FIGS. 4 (a) and 4 (b), the manually operated drive unit 3 is integrally constructed with the power-operated drive unit 4 and gear differential unit 5.

Figure 4C:
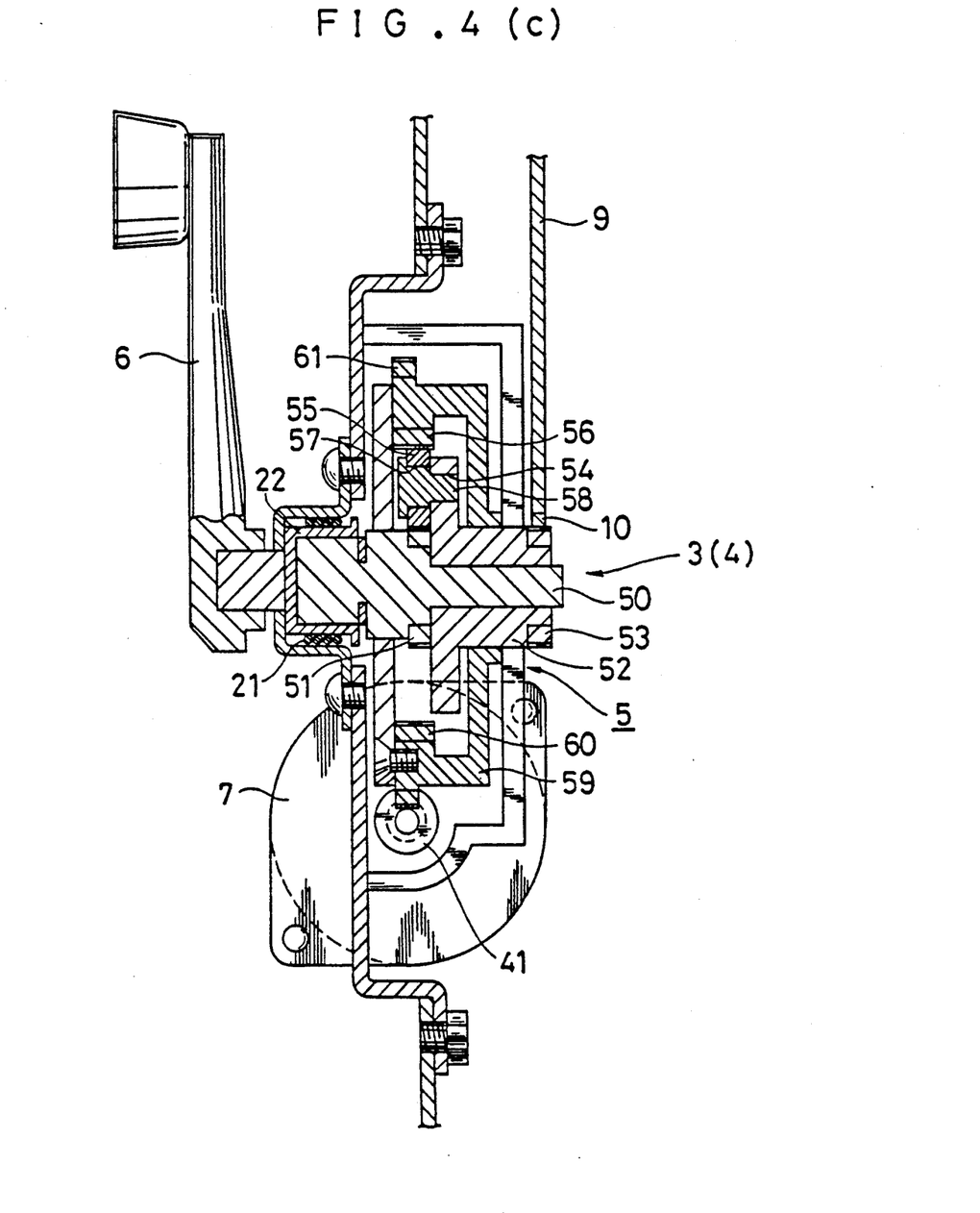

In FIG. 4 (c), numeral 50 designates a main shaft having a gear 51 formed generally centrally thereof. This shaft is an integral extension of the earlier mentioned sprocket rolling piece 23.

A flange 52 is rotatably fitted on the main shaft 50. The flange 52 is formed at its smaller end portion with a gear 53 and at a specified location in its larger end portion with a hole 54 for fitting thereon of a bush 58 which will be described hereinafter.

Numeral 55 designates a planetary rolling piece formed on its outer periphery with a gear 56 which is in mesh with the gear 51 and a gear 60 formed on the inner periphery of the differential unit casing 59. The planetary rolling piece 55 has a hole 57 formed centrally thereof, and is rotatably mounted in the hole 54 by a bush 58 extending through the hole 57.

Numeral 59 designates a differential unit casing having a worm wheel 61 formed on the outer periphery thereof which is rotatably fitted on both the main shaft 50 and flange 52.

The arrangement of the second embodiment is as described above. Nextly, the function thereof will be explained.

(2-1): Opening and closing of the window glass 13 by hand

As turning effort is applied by the handle 6, the main shaft 50 is rotated. The gear 51 of the main shaft 50 causes the planetary rolling piece 55 to rotate about the main shaft 50 while causing it to rotate on its axis within the differential unit casing 59 which is inhibited from rotation. Following the rotation of the planetary rolling piece 55, the flange 52 is rotated on its axis and accordingly the gear 53 of the flange 52 allows the sector gear 10 to move upward and downward.

(2-2): Opening and closing of the window glass 13 by power operated mechanism

The differential unit casing 59 is rotated by the worm gear 41 of the motor 40. In this case, since the main shaft 50 is locked in position, the gear 60 on the inner periphery of the differential unit casing 59 in rotation causes the planetary rolling piece 55 to turn on its axis and concurrently to rotate about the gear 51. Accordingly, the flange 52 is allowed to rotate on its axis by means of the bush 58 extending through the planetary rolling piece 55 so that the sector gear 10 is caused to move upward and downward by the gear 53.

As above described, in this second embodiment the manually operated drive unit 3 and the power-operated drive unit 4 are constructed integrally with each other and, therefore, parts, such as chain 8, shown in the first embodiment are omitted. Thus, the automobile window opening and closing device 1 can, in its entirety, be made compact, which fact means greater ease of handling at the time of manufacturing and otherwise.

In each of the foregoing first and second embodiments, the gear differential unit 5 is of a mechanical arrangement such that in the event of, for example, any electrical trouble having occurred, window opening and closing operation by at least the manually operated drive unit 3 can be performed independently of the occurrence of such trouble.

In the above embodiments, the respective gear differential units 5 are of different arrangements; it is noted, however, that the arrangement of the gear differential unit 5 in the first embodiment may be employed in the second embodiment, or conversely that in the second embodiment may be employed in the first embodiment. Details as to gear configuration and/or arrangement are not particularly limited to those shown.

Third Embodiment

Nextly, a third embodiment of the invention will be described. For simplicity of explanation, description of parts identical with those in the first embodiment is omitted.

Figure 6:
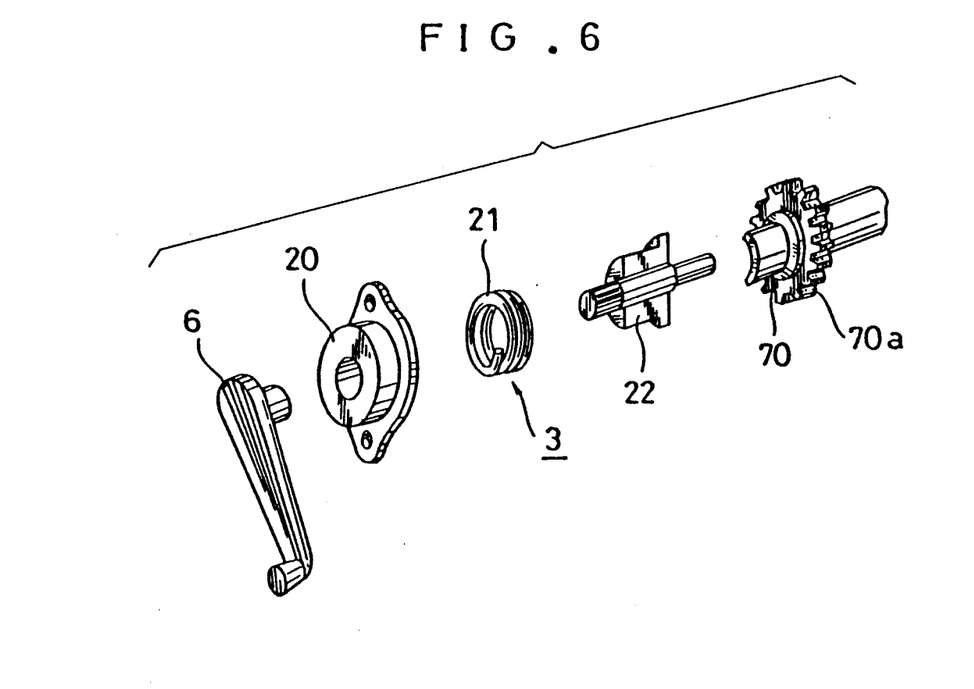
FIG. 6 is a perspective view showing in detail the arrangement of a manually operated opening and closing unit 3 in the third and fourth embodiments.

In this embodiment, the mechanism for transmission of driving force only from the handle 6, or a mechanism which may be termed as "follow movement inhibiting mechanism", in the manually operated drive unit 3 is substantially same as that of the first embodiment shown in FIG. 2 (b), except that, as FIG. 6 shows, the mechanism has a gear rolling piece 70 instead of the sprocket rolling piece 23 in the first embodiment.

The power-operated drive unit 4 comprises a similar mechanism which can transmit driving force only from the motor 7, or a follow movement inhibiting mechanism, which will be described below.

In FIGS. 5 (a) and 5 (b), the motor 7 drives a worm gear 41. A shaft 75 has a worm wheel 76a which is in mesh with the worm gear 41, and a gear face 75a which is in mesh with a gear face 72a to be described hereinafter.

The power-operated drive unit 4 is of such arrangement that the worm gear 41 drives the worm wheel 76a, which arrangement functions as a follow movement inhibiting mechanism for prevention of rotation.

Transmission means for transmitting respective driving forces from the manually operated drive unit 3 and the power operated drive unit 4 to the driving arm 9 will now be explained.

In FIGS. 5 (a) to 5 (c), numerals 71, 72 designate gears of different pitch diameters which are rotatably supported in concentric relation with the driving arm 9, and 71a, 72a designate gear faces formed on their respective outer peripheries.

Figure 5A:
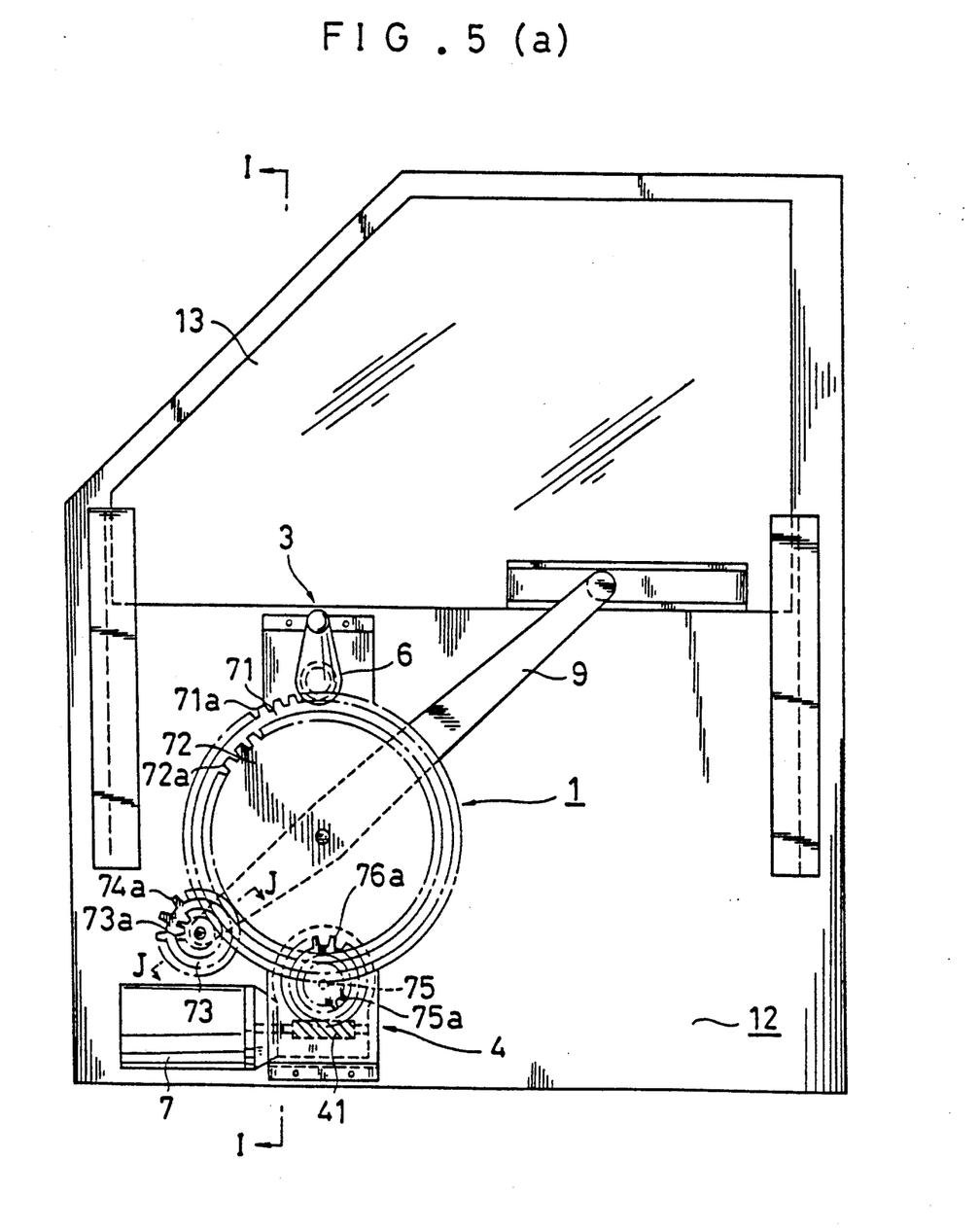
Figure 5B:
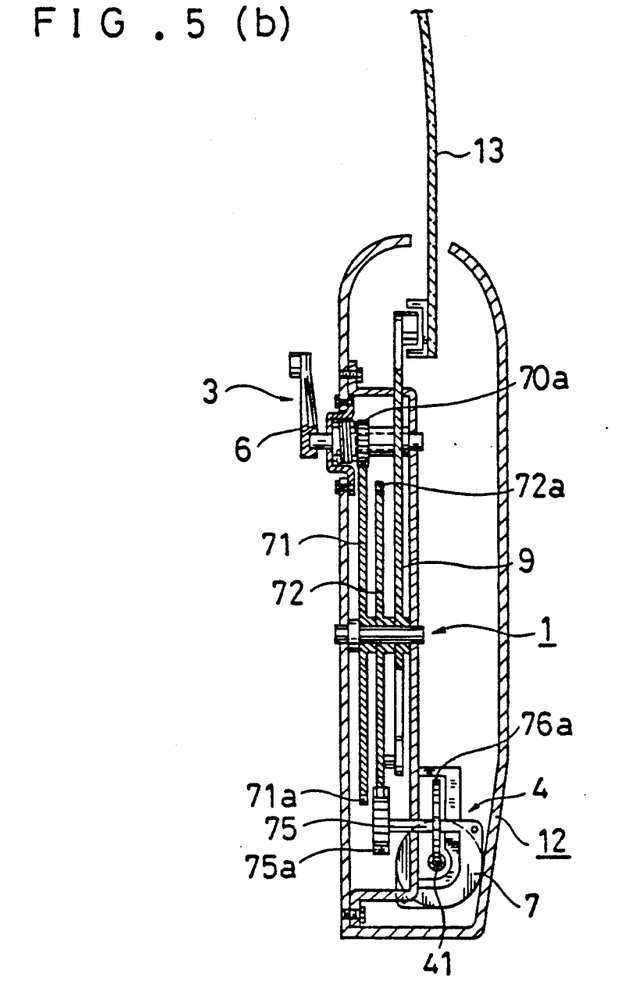
Figure 5C:
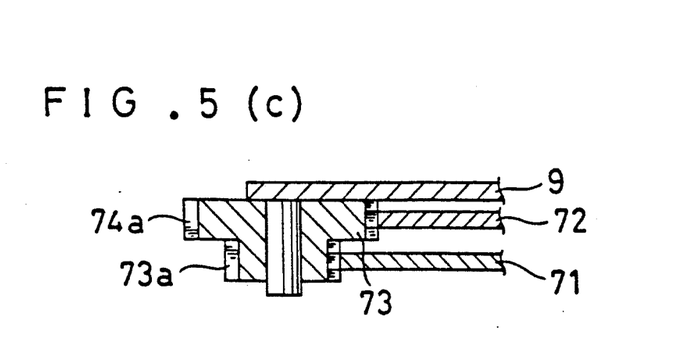
Figure 5D:
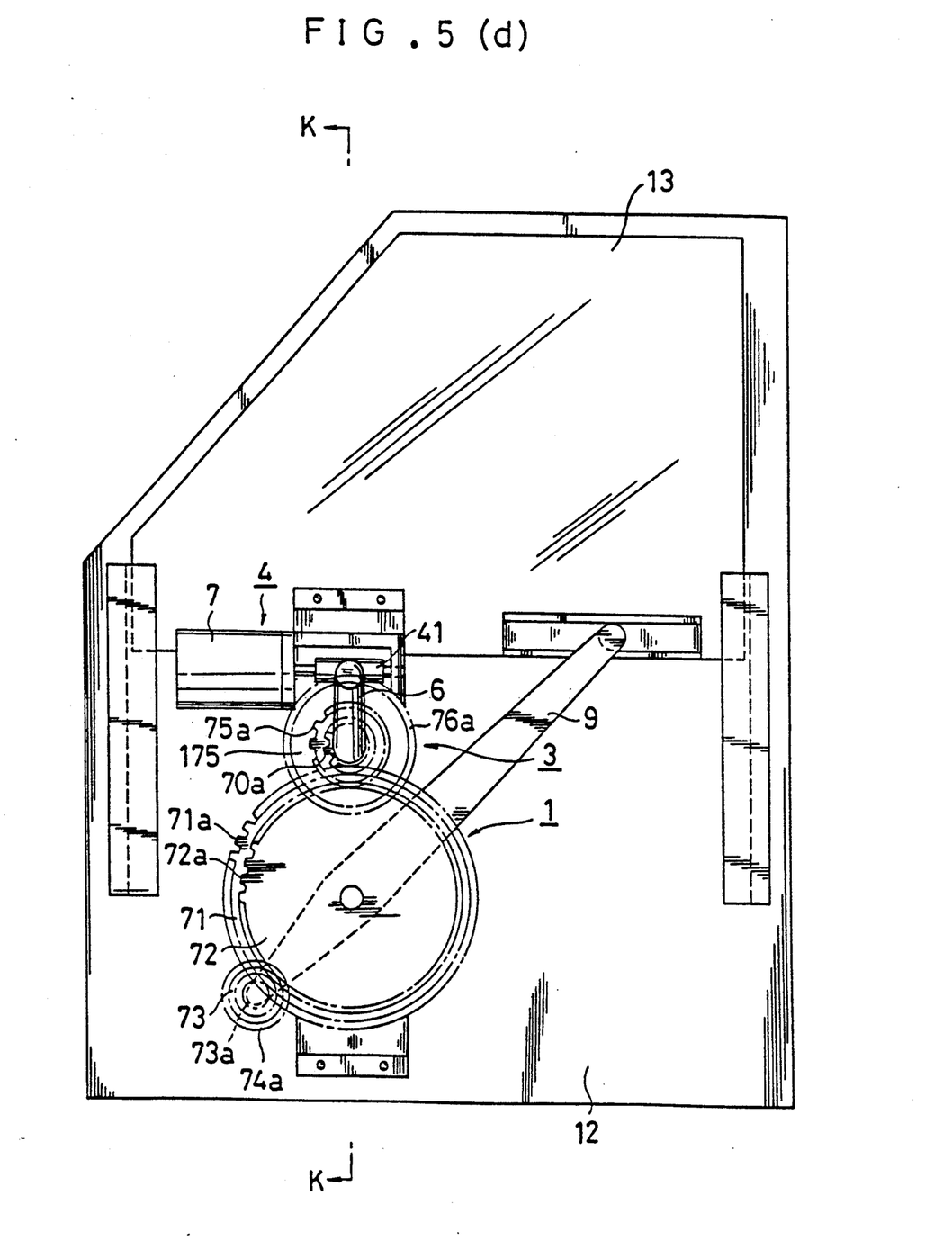
Figure 5E:
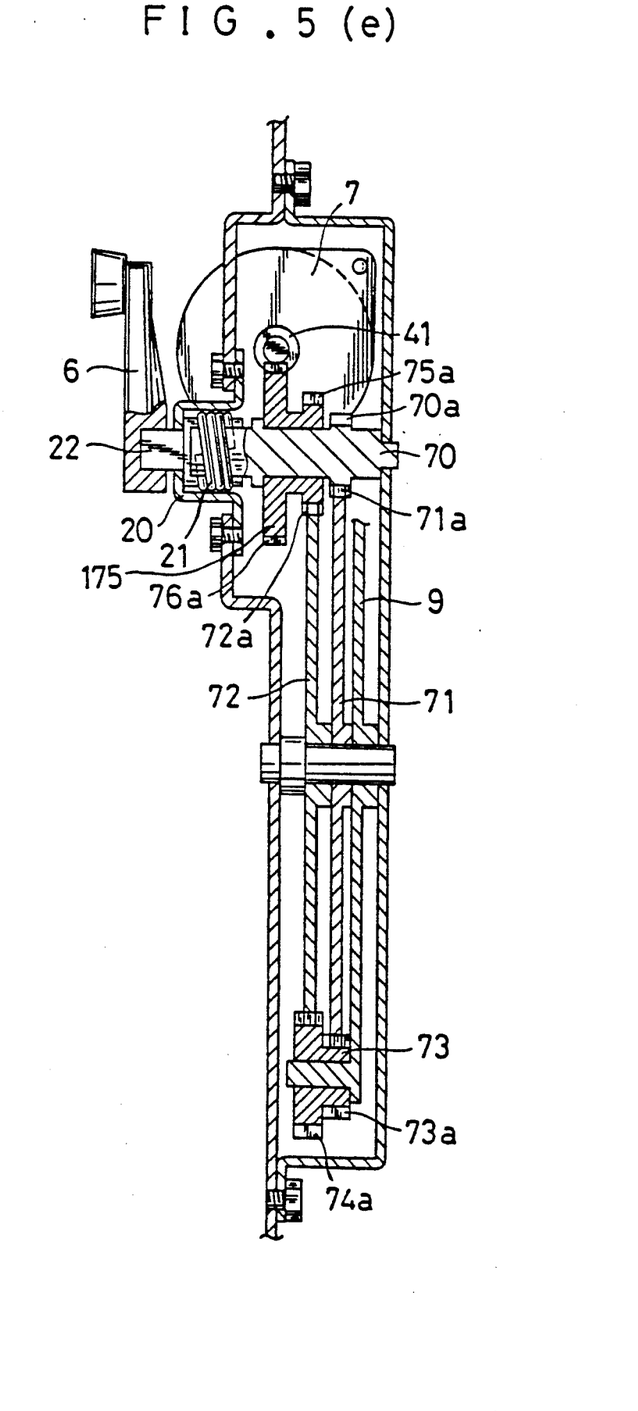

Numeral 73 designates an up-and-down movable gear rotatably supported at one end of the driving arm 9 and having gear faces 73a, 74a in mesh with the gear faces 71a, 72a. When the gear faces 71a, 72a are at rest, the up-and-down movable gear 73 is locked as held in mesh with them, because of the difference in the number of teeth between its gear faces 73a and 74a.

The arrangement of the present embodiment has now been described. Nextly, the function thereof will be explained.

(3-1): Opening and closing of the window glass 13 by hand

In FIGS. 5 (a) to 5 (c), when the handle 6 is turned counterclockwise, the gear 71 is subjected to clockwise turning effort through the gear face 70a of the gear rolling piece 70. As a consequence, the up-and-down movable gear 73 is subjected to counterclockwise turning effort through the gear face 71a. Whilst, the other gear 72 with which the gear 73 is also in engagement is prevented from turning by the power-operated drive unit 4. Therefore, the gear 73 is allowed to move while in rotation under the gear 72. As a result, the other end of the driving arm 9 is moved upward to lift the window glass 13, thus enabling the window glass 13 to be closed.

Conversely, the window glass 13 can be lowered by turning the handle 6 clockwise.

(3−2): Opening and closing the window glass 13 by power-operated mechanism

In FIGS. 5 (a) to 5 (c), when turning effort is applied to the worm wheel 76a of the shaft 75 through rotation of the worm gear 41 of the motor 7, the gear 72 is rotated via the gear face 75a. As a result of the rotation of the gear 72, the up-and-down movable gear 73 is caused to rotate on its own axis. In this case, the manually operated drive unit 3 is unrotatable from the gear 71 side. Therefore, the gear 73 move along the outer periphery of the gear 71 while in mesh therewith, so that the driving arm 9 is pivotally driven to lift and lower the window glass 13.

One example of application of the third embodiment is shown in FIGS. 5 (d) and 5 (e). In the figures, the shaft 75 is in the form of a geared structure 175 having a hole 8, which is rotatable about the gear rolling piece 70. In this example, the power operated drive unit 4 and the manually operated drive unit 3 are integral with each other, so that the entire arrangement of the automobile window opening and closing device 1 can be made compact.

Fourth Embodiment

Nextly, a fourth embodiment of the invention will be described. For simplicity of explanation, description of parts identical with those of the third embodiment is omitted.

Figure 7A:
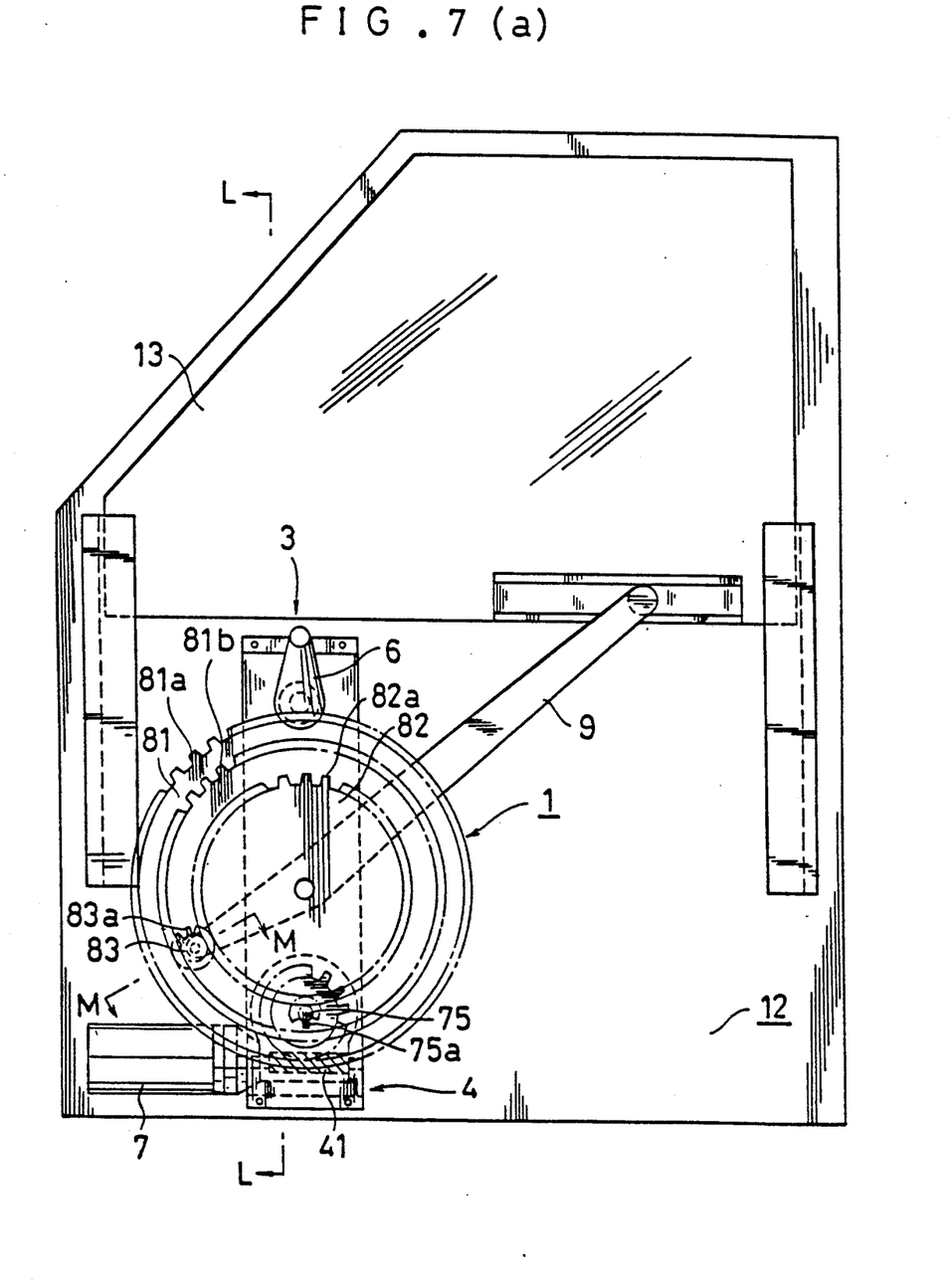
Figure 7B:
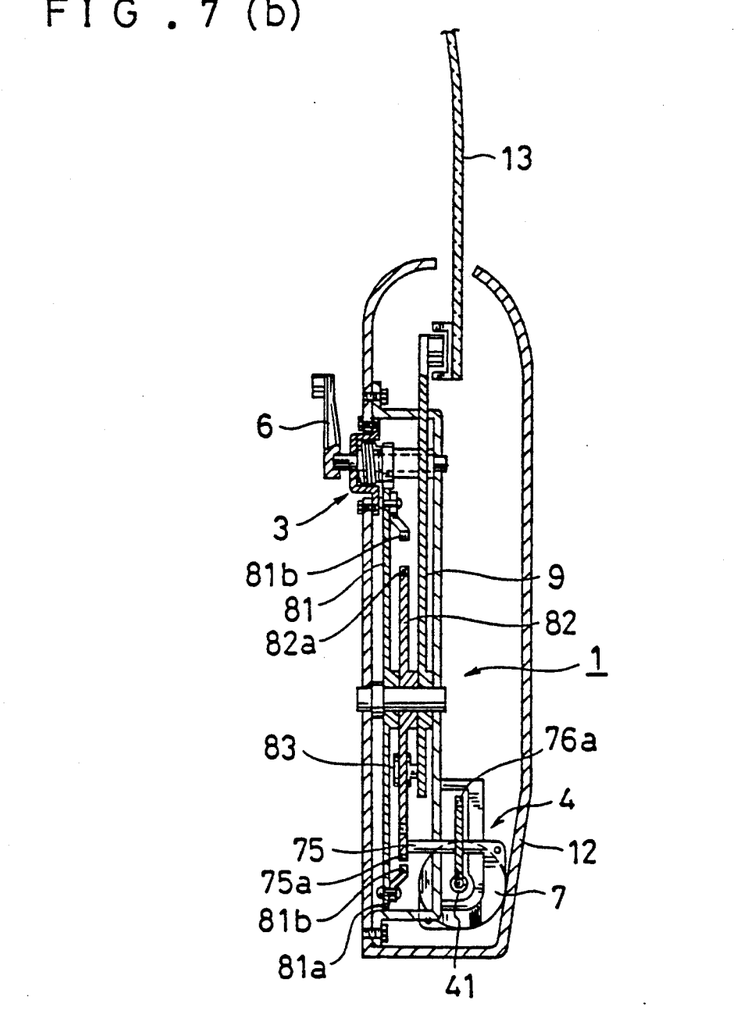
Figure 7C:
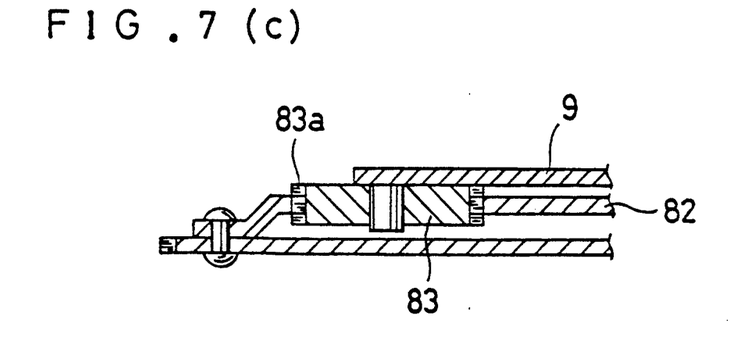

In FIGS. 7 (a), 7 (b), and 7 (c), numerals 81, 82 designate gears provided concentrically with the driving arm 9. The gear 81 has gear faces 81a, 81b formed on its outer and inner peripheries respectively, and the gear 82 is formed with a gear face 82a which is opposed to the gear face 81b of the gear 81. An up-and-down movable gear 83 is disposed between the gear face 82b and the gear face 82a, the gear 83 being held in mesh with the gear faces 81b, 82a.

The gear face 82a of the gear 82 is in mesh with the gear face 75a of the shaft 75 so as to enable transmission of driving force from the power operated drive unit 4.

The arrangement of the embodiment is as described above, and nextly the function thereof will be explained.

(4—1): Opening and closing of the window glass 13 by hand

The gear 81 is rotated when turning effort from the handle 6 is applied to it. In this case, the gear 82 is prohibited from turning by the power operated drive unit 4. Therefore, the up-and-down movable gear 83 is moved as it is rotated between the gear face 81b and the gear face 82a in same direction as the direction of rotation of the gear 81.

The movement of the up-and-down movable gear 83 allows the driving arm 9 to be pivotally moved, and thus the window glass 13 is moved upward and downward.

(4—2): Opening and closing of the window glass by the power-operated mechanism

As the motor 7 is driven, the gear 82 is rotated via the worm gear 41 and worm wheel 76a, whereby the up-and-down movable gear 83 is subjected to turning effort. In this case, the gear 81 is prevented from turning by the manually operated drive unit 3. Therefore, the up-and-down movable gear 83 is moved under rotation between the gears 81 and 82 in same direction as the direction of rotation of the gear 82 and thus the window 13 is moved upward and downward.

In this embodiment, as described above, the manually operated drive unit 3 and the power-operated drive unit 4 are integrally constructed, and therefore the automobile window opening and closing device 1 can, in its entirety, be made compact, which means greater ease of handling at the time of manufacture.

In the foregoing third embodiment, the gears 71, 72 are of different pitch diameters and accordingly the up-and-down movable gear 73 is locked in mesh with the gears 71, 72 when the gears 71, 72 are at rest. However, the gears 71, 72 are not limited in configuration to the above described, and where other means are employed for locking the driving arm 9, the gears 71, 72 may be of same configuration.

In the automobile window opening and closing device according to any of the foregoing first to fourth embodiments, it is possible to open and close the window glass 13 by means of both the manually operated drive unit 3 and the power-operated drive unit 4. Accordingly, the driver or other person in the car can selectively operate the drive units 3 and 4 as required.

Therefore, for example, when a long-time stop is required for taking a rest in the car, the window glass 13 can be freely moved upward and downward by means of the manually operated drive unit 3, if the driver has stopped the engine and turned off the power supply. As such, good power economy can be achieved.

When the car is running, sufficient power supply is available from the engine and the window glass 13 can be opened and closed by mere switch control.

The automobile window opening and closing device 1 as illustrated in any of the foregoing first to fourth embodiments is of mechanical arrangement and, therefore, window opening and closing can be effected by at least the manually operated drive unit 3 in the event of, for example, some electrical trouble having occurred, thus rendering the power-operated drive unit 4 inoperative. Thus, the device provides improved safety in the event of such trouble.

In the above described first to fourth embodiments, the rotation preventing mechanism of the manually operated drive unit 3 is provided through restrained rotation of the spring 21 within the limits defined by contraction and expansion thereof. However, such arrangement is not essential, and any other suitable arrangement may be employed in place thereof.

In the above described first to fourth embodiments, the automobile window opening and closing device is applied to doors; but the scope of its application is not limited to doors. Of course, the device may be applicable to windows of other parts than doors.

Details of the arrangement of the invention may be varied, altered or modified in design within the scope and spirit of the invention, and accordingly there is no particular limitation as to possible changes in specifications.

What is claimed is:

1. An automobile window opening and closing device for lifting and lowering a window through pivotal movement of a driving arm under a drive force from a manually operated drive unit or a power-operated drive unit, comprising an up-and-down movable gear rotatably supported at one end of said driving arm and held in mesh with concentrically rotatably supported two gears so as to be pivotally movable along the outer peripheries of said two gears, said two drive units each being interlockingly connected with a corresponding one of said two gears, said two drive units each being equipped with a follow movement preventing mechanism for preventing the one drive unit from rotating on its own axis when it is subjected to a drive force from the other drive unit, so that said manually operated and power-operated drive units can be selectively operated for window lifting and lowering.

2. An automobile window opening and closing device for lifting and lowering a window through pivotal movement of a driving arm under a drive force from a manually operated drive unit or a power-operated drive unit, comprising an up-and-down movable gear rotatably supported at one end of said driving arm and held between and in mesh with concentrically rotatably supported two gears so as to be povotally movable along a space between the outer periphery of one of said two gears and the inner periphery of the other gear, said two drive units each being interlockingly connected with a corresponding one of said two gears, said two drive units each being equipped with a follow movement preventing mechanism for preventing the one drive unit from rotating on its own axis when it is subjected to a drive force from the other drive unit, so that said manually operated and power-operated drive units can be selectively operated for window lifting and lowering.

* * * * *